(No Model.) 3 Sheets—Sheet 1.
G. D'INFREVILLE.
PNEUMATIC TIRE.
No. 581,210. Patented Apr. 20, 1897.
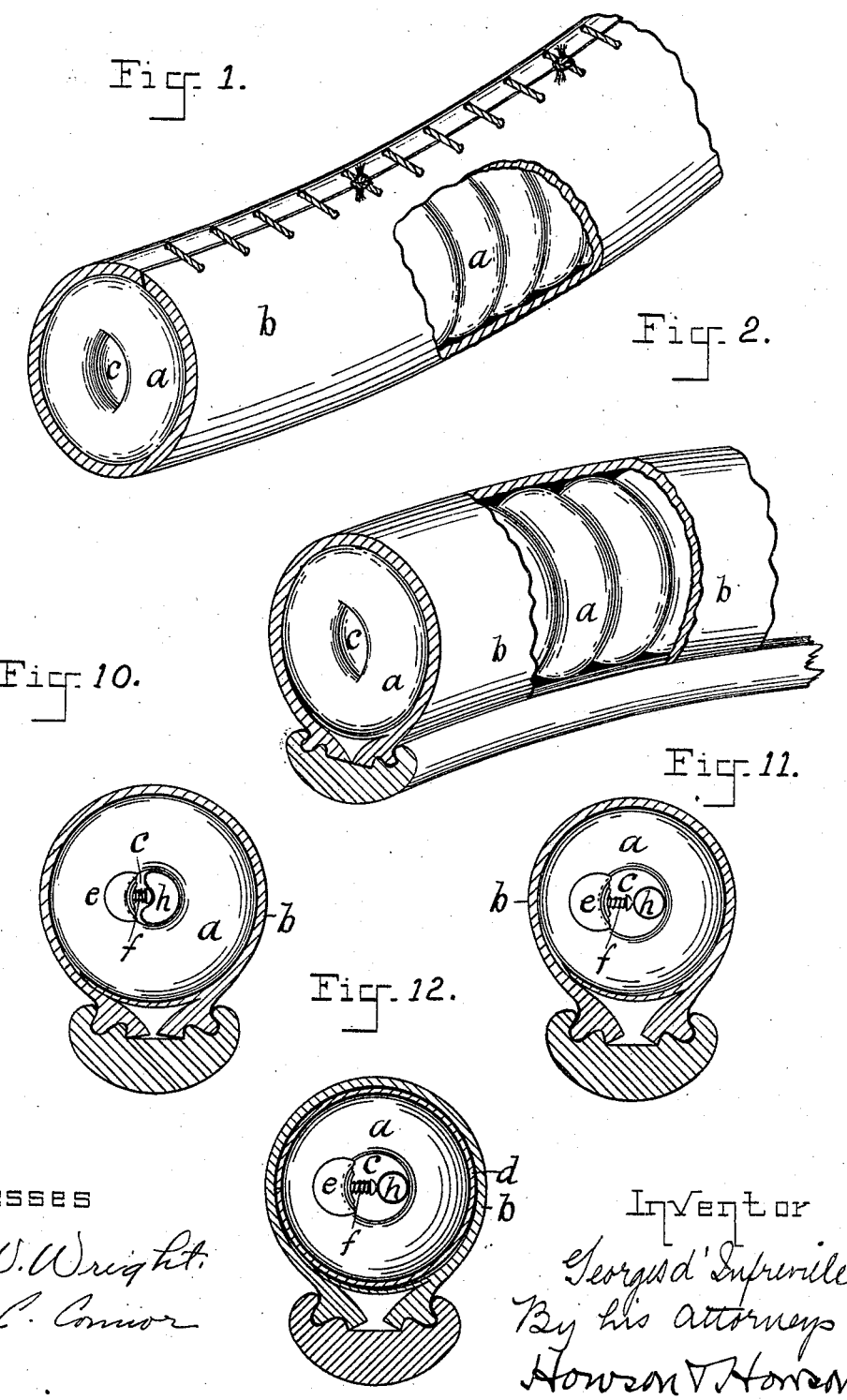

(No Model.) 3 Sheets—Sheet 2.
G. D'INFREVILLE.
PNEUMATIC TIRE.
No. 581,210. Patented Apr. 20, 1897.
Fig. 7.
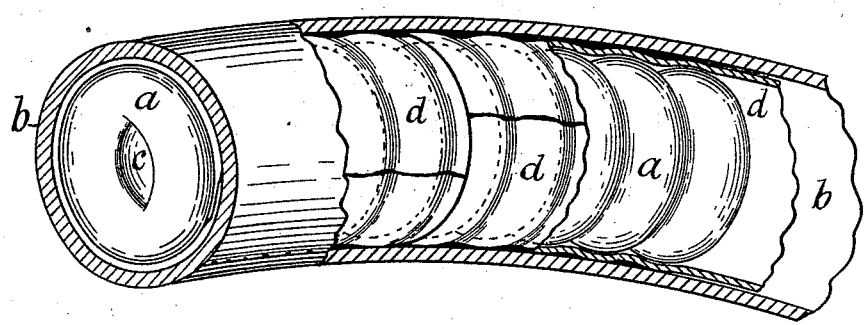
Fig. 6.
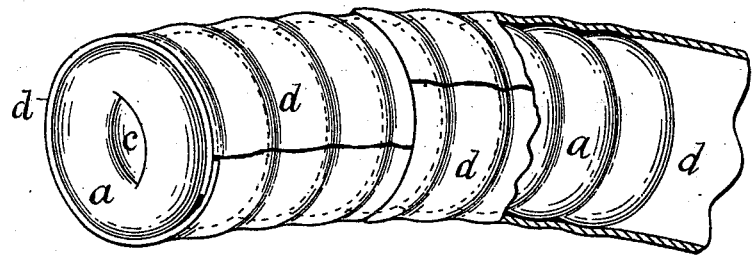
Fig. 3. Fig. 4. Fig. 5.
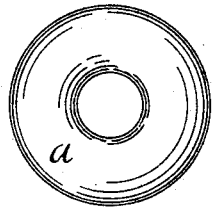  
Witnesses
F. W. Wright
S. C. Connor
Inventor
Georges d'Infreville
By his attorneys
Howson & Howson (No Model.) 3 Sheets—Sheet 3.

G. D'INFREVILLE.
PNEUMATIC TIRE.

No. 581,210. Patented Apr. 20, 1897.

Witnesses
F. W. Wright.
S. C. Connor

Inventor
Georges d'Infreville
By his attorneys
Howson & Howson

UNITED STATES PATENT OFFICE.

GEORGES D'INFREVILLE, OF NEW YORK, N. Y.

PNEUMATIC TIRE.

SPECIFICATION forming part of Letters Patent No. 581,210, dated April 20, 1897.

Application filed December 23, 1896. Serial No. 616,734. (No model.)

*To all whom it may concern:*

Be it known that I, GEORGES D'INFREVILLE, a citizen of the Republic of France, and a resident of the city of New York, N. Y., have invented Improvements in Pneumatic Tires, of which the following is a specification.

My invention relates to pneumatic tires, and has for its object to construct a tire that will not collapse or become unserviceable when punctured or cut, even at several different points.

Another object of my invention is to provide a tire which can be easily and quickly repaired at comparatively small cost.

My invention consists in forming a tire of a series of small hollow rings or endless tubes of rubber or other such material placed side by side in such a manner that the equatorial plane of each of the rings is perpendicular to that of the completed tire, the said series of small endless tubes, when so placed, forming a larger hollow ring or tube to encircle the wheel-rim, and in providing means for inflating the tire thus formed.

Figure 8:
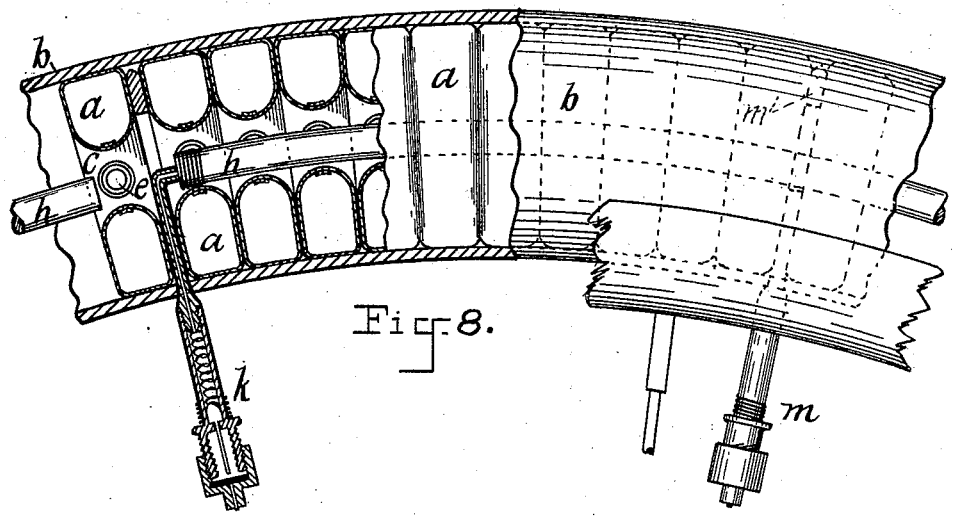
Figure 9:
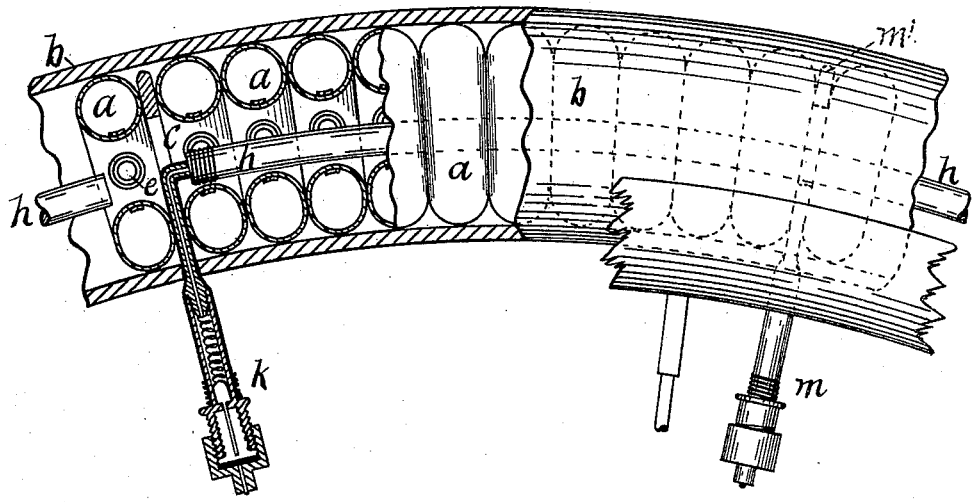

In the accompanying drawings, Figure 1 is perspective view of a portion of a tire, showing the tubes inclosed in a laced outer covering. Fig. 2 is a perspective view of a portion of a rim and tire, showing the tubes inclosed in a split outer covering, such as is known as the "clencher-tire." Figs. 3, 4, and 5 show in side, end, and sectional views one of the individual hollow rings or tubes. Fig. 6 is a perspective view, partly in section, of several small tubes bound together, as hereinafter explained; and Fig. 7 is a similar view showing the tubes thus formed inclosed in an outer casing. Fig. 8 is a view, partly in section, of a portion of a complete tire when inflated. Fig. 9 is a similar view showing the tire uninflated. Figs. 10 to 12 are detail views hereinafter explained.

To illustrate the principle of my invention, I have shown in Figs. 1 and 2 a tire consisting of a number of small hollow rings or endless tubes $a$, of rubber or other expansible material, placed side by side in an outer covering $b$. These small hollow rings or tubes $a$ are shown separately in Figs. 3, 4, and 5. Several of these tubes $a$ may be punctured without rendering the tire unserviceable, for when a tube collapses the tubes each side thereof will fill up the space formerly occupied by the collapsed tube, and several tubes may collapse without appreciable change. To repair the tire, the punctured or collapsed tubes are removed and new ones inserted in their places.

Referring to Figs. 6 and 7, the tubes $a$ are first cemented together side by side to form a larger hollow ring or tube having an airtight inner conduit $c$. To further insure the conduit $c$ being air-tight, I cement strips of thin india-rubber $d$ about the made-up tube. Each strip $d$ covers only portions of the tire, say three or four of the tubes $a$, and it is therefore only necessary to peel off that section of rubber $d$ which covers the section containing the tube $a$ to be replaced. One method of inflating a tire thus made up is to force compressed air into the central conduit $c$, which causes each tube to expand in its equatorial plane until the outer covering is completely expanded, the outer circumferences of the tubes $a$ flattening out against the inner surface of the outer covering $b$.

The preferred method of inflating the tire, however, is as follows: Referring to Figs. 8 to 12, I provide each tube $a$ with an inwardly-opening valve $e$, having a stem $f$. A valve $m$ is fitted to the inner conduit $c$ in any convenient manner. As shown, a rubber washer $m'$ is formed with the inner part of the valve, and this washer is cemented between two of the tubes $a$. When compressed air is forced through the valve $m$ into the inner conduit $c$, the air enters each individual tube $a$ through its valve $e$ with equal pressure. To deflate these tubes $a$, I provide a rubber pipe $h$, loose in the inner conduit $c$, and to one end of which is connected the valve $k$, the other end being closed. The valve $m$ is first opened and then compressed air forced into the tube $h$, which latter, in expanding, presses against the valve-stems $f$ and opens the valves $e$. The compressed air escapes from the tubes $a$ through the conduit $c$ and open valve $m$.

Fig. 9 shows the tire before it is inflated, and Fig. 8 after inflation. Fig. 11 is a cross-section of Fig. 9.

Referring to Figs. 10 and 11, it will be seen that when the tube $h$ is uninflated it does not act on the valve-stem $f$, Fig. 11, but when inflated, Fig. 10, the tube $h$ presses against the valve-stems $f$ to open the valve.

Fig. 12 is a view similar to Fig. 11, showing the strips $d$.

If in the making up of the tire the tubes are pressed together laterally, there is a constant tendency to press the cemented sides of the tubes together to close up a punctured tube and its puncture, and if a nail or the like gets pushed between two of the tubes to close the tubes together again.

I claim as my invention—

1. A wheel-tire composed of a series of small inflated hollow rings of rubber, cemented together to form a larger hollow ring or tube having an inner air-tight conduit, substantially as set forth.

2. A wheel-tire composed of a series of small inflated hollow rings of rubber, cemented together to form a larger hollow ring or tube having an inner air-tight conduit, and an outer covering therefor, substantially as set forth.

3. A wheel-tire composed of a series of small hollow rings of rubber, cemented together to form a larger hollow ring or tube having an inner air-tight conduit, and means for inflating the tire thus formed, substantially as set forth.

4. A wheel-tire composed of a series of small hollow rings of rubber, cemented together to form a larger hollow ring or tube having an inner air-tight conduit, and means for inflating the small hollow rings forming the larger tube, substantially as set forth.

5. A wheel-tire composed of a series of small hollow rings of rubber, cemented together to form a larger hollow ring or tube having an inner air-tight conduit, each of the said small hollow rings being provided with an inflating-valve on its inner circumference, and means for forcing air into the said inner conduit, substantially as set forth.

6. A wheel-tire composed of a series of small hollow rings of rubber, cemented together to form a larger hollow ring or tube having an inner air-tight conduit, each of the said small hollow rings being provided with an inflating-valve on its inner circumference, and a valved passage to the said inner conduit, substantially as set forth.

7. A wheel-tire composed of a series of hollow rings cemented together to form a larger hollow ring or tube having an inner air-tight conduit, each of the said small hollow rings being provided with an inflating-valve having a valve-stem passing into the inner conduit, a loose pipe in the said conduit, and means for inflating the said pipe, and means for forcing air into the said conduit, all substantially as and for the purposes set forth.

In testimony whereof I have signed my name to this specification in the presence of two subscribing witnesses.

GEORGES D'INFREVILLE.

Witnesses:
F. W. WRIGHT,
S. C. CONNOR.